United States Patent Office 3,246,665
Patented Apr. 19, 1966

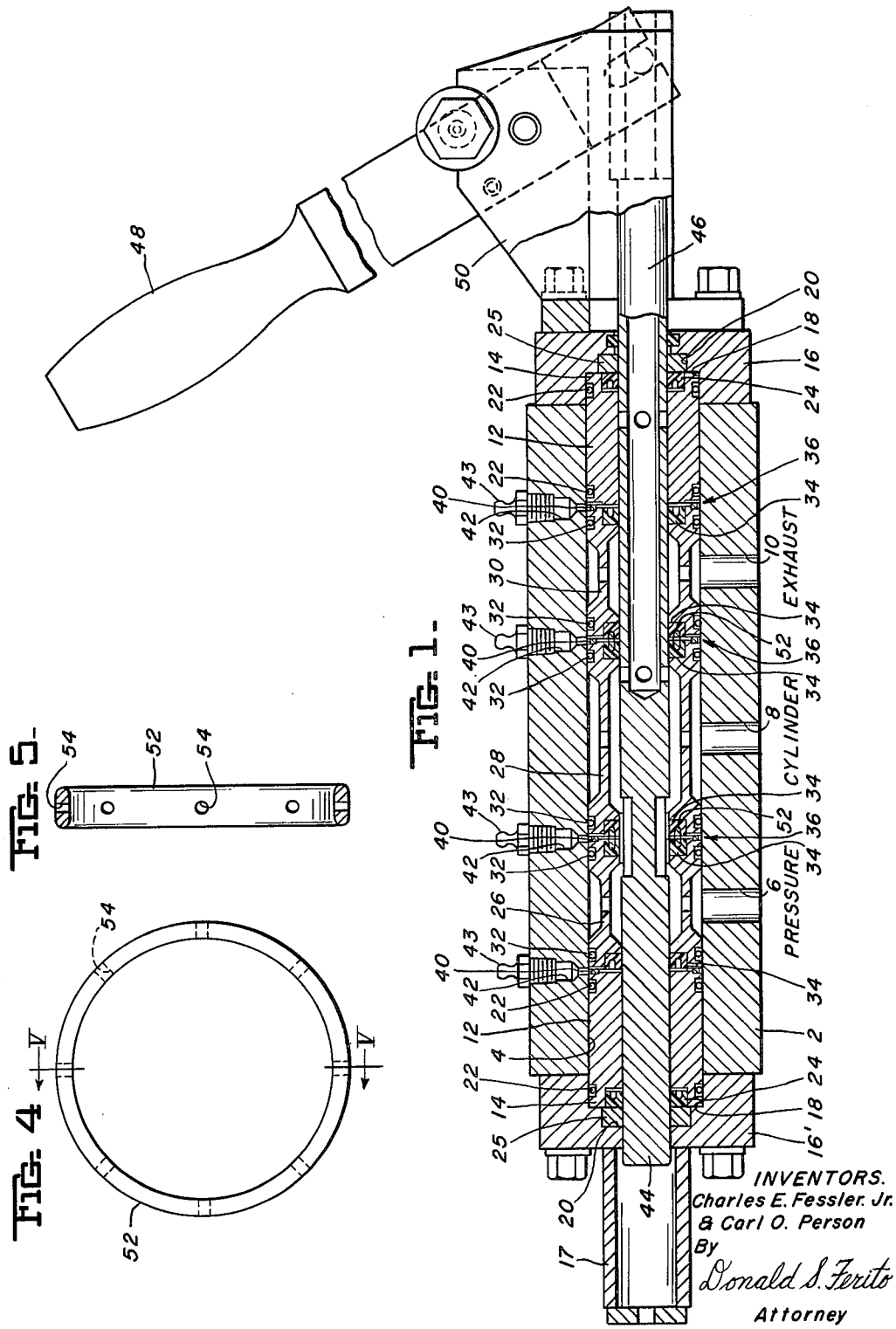

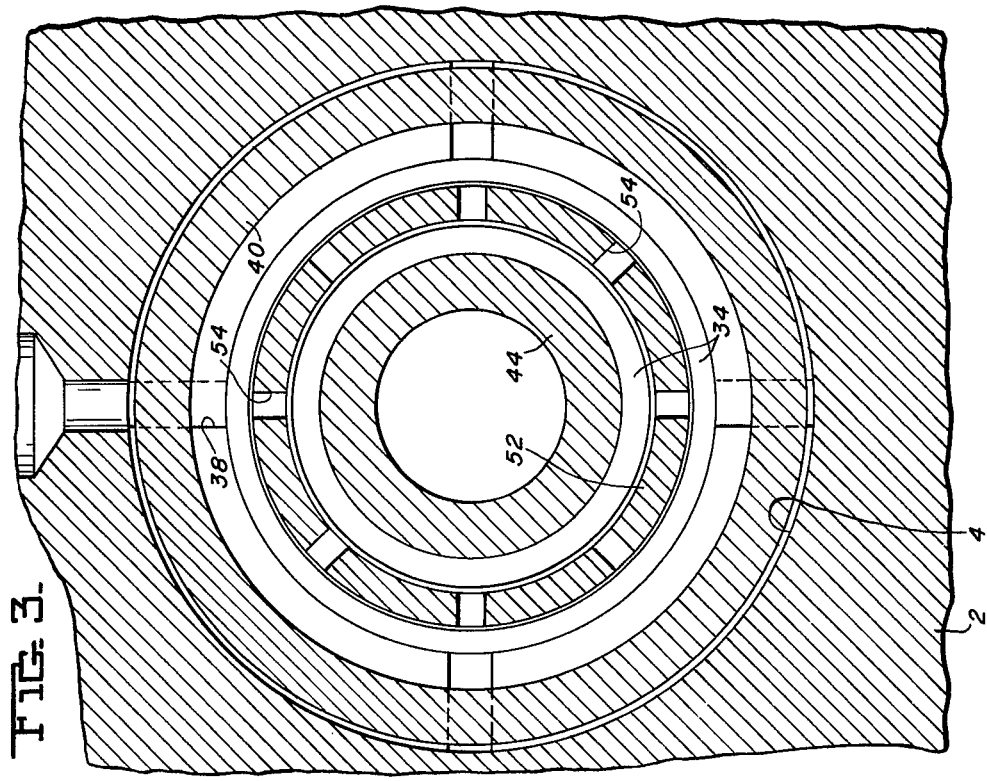
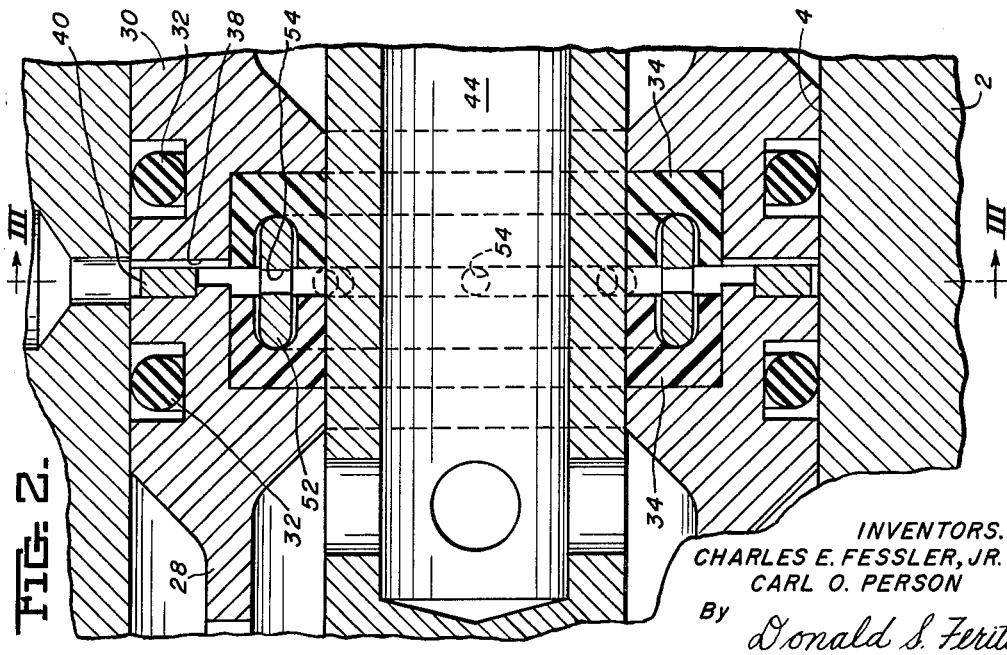

3,246,665
LUBRICATED THREE WAY FLUID VALVE
Charles E. Fessler, Jr., Ross Township, Allegheny County, and Carl O. Person, Sharon, Pa., assignors to Fessler Machine Company, a corporation of Pennsylvania
Filed Apr. 24, 1963, Ser. No. 275,293
3 Claims. (Cl. 137—246.22)

The present invention relates generally to valves for fluid pressure lines and, more particularly, to hydraulic valves used to control the flow of fluids under pressure in a pressure system connected with work-effecting mechanisms to effect movement of such mechanisms.

The invention has for one of its objects the provision of an improved fluid valve assembly which includes a unique and novel packing arrangement which enables the valve to withstand pressures from either longitudinal direction substantially greater than was possible heretofore with valves of comparable size.

It is another object of the invention to provide an improved fluid valve assembly having a packing arrangement that is uniformly and positively effective notwithstanding the position of the valve plunger in the bore of the valve housing.

It is another object of the invention to provide an improved fluid valve assembly which includes a packing arrangement which is effective to eliminate the need for an extremely close fit, approaching "metal-to-metal" tolerance, of the valve plunger in the valve bore as was required heretofore in valves of the plunger type operating under relatively high pressures.

It is yet another object of the invention to provide an improved fluid valve assembly including a valve housing, a valve plunger reciprocable in the housing, packing and bushings surrounding the plunger; in which the bushings are constructed and arranged in a unique manner with separator means whereby a reservoir of lubricant for the packing and plunger can be constantly maintained with a minimum of service.

It is a further object of the invention to provide an improved fluid valve assembly which is simple yet rugged in construction and which can be manufactured at relatively low cost.

It is also an object of the invention to provide an improved fluid valve assembly which can be quickly and easily assembled and disassembled by unskilled workmen.

Finally, it is an object of the invention to provide a valve construction capable of attaining all of the above objects, and which is extremely durable in use and requires only infrequent maintenance service.

These and other objects will become more apparent after referring to the following specification and attached drawing, in which:

FIGURE 1 is a longitudinal sectional view;

FIGURE 2 is a partial enlarged detail view of a portion of FIGURE 1;

FIGURE 3 is a sectional view taken along the line III—III of FIGURE 2;

FIGURE 4 is a front elevational view of a filler ring of the invention; and

FIGURE 5 is a sectional view taken along the line V—V of FIGURE 4.

As an example of one form which the invention may take, a 3-way hydraulic valve constructed in accordance therewith is described in the following specification and shown in the accompanying drawing; but it is to be understood that the invention may be embodied in other forms and that changes may be made in the form described and shown without exceeding the scope thereof as defined in the appended claims.

Referring more particularly to the drawing, reference numeral 2 designates an elongated valve housing or main body having a center bore 4 of substantially uniform diameter extending axially therethrough. The valve housing 2 is provided with a pressure port 6, a cylinder port 8, and an exhaust port 10, each of which communicates with the center bore 4 and extends normal thereto. A hollow cylindrical spacer or sleeve member 12 is rigidly disposed in each end of the center bore 4. The outer end 14 of each of the spacers 12 projects outwardly from the valve body and fits into a cap ring 16, one of which is rigidly affixed to each end of the valve body 2 by cap screws or the like.

Each of the cap rings 16 is formed with a three-step countersunk opening therethrough providing a first annular recess 18 and a second annular recess 20. The cap ring 16' at the left end of the valve body is formed with a hollow elongated projection 17 extending axially therefrom for a purpose which will become apparent.

The projecting ends 14 of the spacer members 12 fit into the recess 18. O-ring seals 22 are seated in peripheral grooves on each of the spacers 12 adjacent each end thereof to seal it in the bore 4 and the recess 18. The outer end of each spacer is cut away around its inner periphery to provide a seat for a C cup packing ring seal 24, the purpose of which will become apparent. The C cups 24 are each disposed with their open sides facing inwardly of the bore 4. An annular thrust bearing 25 is fitted into each of the inner recesses 20 and bears against the outer end of the spacer 12 and the C cup 24 adjacent thereto.

Three apertured, hollow, cylindrical metal bushings or cages 26, 28 and 30 are disposed in spaced axial alignment in the center bore 4 of the valve body between the spacers 12. The bushings 26, 28 and 30 form valve chambers in communication with the ports 6, 8 and 10, respectively.

An outer peripheral groove is provided adjacent each end of each of the bushings for receiving an O-ring seal 32. Each end of each of the bushings is cut away around its inner periphery to provide a seat for receiving a C cup packing ring seal 34 which is disposed with its open face facing outwardly of its respective bushing so that the open sides or channels of the C cups in opposing ends of adjacent bushings are opposed and confront each other as at 36. The right end of each of the bushings 26, 28 and 30 and of the spacer 12 at the right end of center bore 4, as viewed in FIGURE 1, is provided with two radial grooves 38 which extend from the outer to the inner peripheries of the bushings and spacer for a purpose which will be more fully explained hereinafter.

A rigid metal separator ring 40 having an inside diameter greater than the outside diameters of the C cups 24 and 34, but less than the outside diameters of the bushings and spacers, is interposed between adjacent bushings and between the endmost bushings and the spacers 12.

The valve body 2 is provided with radial holes 42, having lubricant fittings 43 therein spaced along its length, aligned with the spaces between adjacent bushings and between the endmost bushings and the spacers 12, as best shown in FIGURE 1. Holes 42 serve as passageways for lubricant to the C cups 34.

A ported valve plunger or spool 44 is mounted for axial reciprocable movement within the valve body 2 through the spacers 12 and the aligned bushings 26, 28 and 30. One end 46 of the plunger projects outwardly of the valve body 2 and is connected with a handle 48 which in turn is pivotally mounted on a bracket 50 which is attached to the valve body. The handle 48 is manipulated manually to move the plunger within the valve body. Although we have shown only manual means for moving the plunger, it will be understood that power means can be provided for this purpose if so desired.

In operation, the ports of the valve are connected with lines (not shown) of a pressure system including a line conducting fluid under pressure to the pressure port 6, a line connecting the cylinder port 8 with a cylinder (not shown) to be operated, and a line connecting the exhaust port 10 with a reservoir tank or sump (not shown).

When the plunger 44 is moved to the right, as shown in FIGURE 1, the exhaust port 10 is blocked and hydraulic fluid flows from the pressure port 6 to the cylinder port 8 to pressurize the piston of the cylinder in one direction. When the plunger 44 is moved to the left, the pressure port 6 is blocked and fluid flows through the valve from the cylinder port 8 to the exhaust port 10. When the plunger 44 is moved to a position intermediate the right and left positions just described, all ports are blocked.

When the valve is in operation, the O-ring seals 22 and 32 prevent leakage of pressure fluid along the surface of the center bore 4, while the C cups 24 and 34 prevent leakage of pressure fluid along the surface of the plunger. The open sides of the C cups 24 and 34 along the length of the plunger 44 face in alternate directions so that leakage of hydraulic fluid along the plunger in either longitudinal direction is prevented. For example, if the flow and pressure of the hydraulic fluid are directed to the right, the C cups which are positioned with their open or channel sides facing toward the left are expanded to fit tightly around the plunger and thus prevent leakage of hydraulic fluid along the plunger surface. Conversely, when the flow and pressure of the fluid are directed to the left, the C cups having their open sides facing toward the right will be expanded and prevent leakage along the plunger.

The confronting arrangement of C cups 34, as at 36, is essential to optimum operation of the valve assembly of our invention to prevent leakage of hydraulic fluid along the plunger when pressure of the fluid is exerted in both directions as, for example, when the plunger is in intermediate position and pressure is being maintained at the cylinder port 8. Under these conditions, the C cup 34 in the right end of bushing 26 will prevent leakage of fluid to the left along the plunger, while the C cup 34 in the left end of bushing 30 will prevent leakage to the right along the plunger. This arrangement is particularly effective in the event that pressure at the cylinder port is intensified either abruptly as caused by a shock-pressure wave or gradually due to increased pressure against the piston of the cylinder. When the pressure at the cylinder port is intensified, the C cups in the right and left ends, respectively, of the bushings 26 and 30 will be further expanded and will seal more tightly around the plunger.

A rigid filler ring 52 having holes or perforations 54 spaced therearound may be interposed between each pair of confronting C cups 34, as at 36, and be seated in the confronting channels of the C cups. The rings 52 prevent the lips of the opposed C cups in each pair from collapsing or shifting to a position where the lips would contact each other and close off the open channels of the C cups. The perforations 54 in the rings 52 permit fluid to enter the open channels and expand the C cups to seal the plunger as described above. The perforations 54 also permit the passage of lubricant to the plunger.

The separator rings 40 provide spaces between adjacent bushings and between the endmost bushings and the spacers 12 extending 360 degrees around the C cups 34 for receiving lubricant from the holes 42 by way of the radial grooves 38. The lubricant received in the spaces formed by the separator rings 40 serves to lubricate the C cups 34 and the plunger 44. The spaces provided by the separator rings hold a greater amount of lubricant than is needed for initial operation of the valve so that a reservoir of lubricant is created in the valve when it is initially lubricated after assembly. This reservoir serves to provide lubricant to the C cups 34 and plunger 44 as it is needed during operation of the valve.

Although we have shown and described the valve assembly of our invention embodied in a 3-way type valve, it will be understood that it can be used in the construction of other type valves as well. The number of bushings with associated C cup and O-ring seals can be varied to correspond to the number of inlet and outlet ports in the valve body so that one bushing is provided for each port. For example, in a 4-way type valve, five bushings are required since this type of valve normally has five inlet and outlet ports in the valve body which may include a pressure port, two cylinder ports, and two exhaust ports. With the exception of the additional bushings and associated C cup and O-ring seals, the structural arrangement of a 4-way type valve constructed in accordance with our invention is the same as that of the 3-way type valve described above and shown in the drawing.

It should now be apparent that we have accomplished the objects initially set forth. We have provided an improved fluid valve assembly which effectively overcomes the various disadvantages and shortcomings of fluid valve assemblies heretofore known by and available to the public. We have provided a fluid valve assembly which can be assembled and installed with ease, economy and a minimum of skill, and which is durable in use and requires only infrequent maintenance and service.

While one embodiment of our invention has been shown and described, it will be apparent that other adaptations and modifications may be made without departing from the scope of the following claims.

We claim:

1. Fluid valve means comprising an elongated main body having an axial bore and fluid inlet and outlet openings, a ported valve plunger axially reciprocable in said bore, an abutment at each end of said bore, a plurality of apertured bushings disposed in axially spaced alignment in said bore between said abutments surrounding said plunger, said bushings being of a number to correspond to the inlet and outlet openings of said main body, the apertures in said bushings communicating with said inlet and outlet openings, said plunger being axially slidable in said bushings, first annular sealing means disposed in each end of each of said bushings and surrounding said plunger for preventing the flow of fluid along said plunger, the outside diameter of each of said first sealing means being less than the outside diameter of its respective bushing, second sealing means seated around the outer periphery of each of said bushings for preventing the flow of fluid along said bore, and a rigid annular separator ring disposed between adjacent ones of said bushings and between said abutments and the bushings adjacent thereto, each of said separator rings having an inside diameter greater than the outside diameters of said first sealing means adjacent thereto but less than the outside diameters of the bushings and abutments adjacent thereto, the end of one of said bushings and said abutments adjacent each of said annular separator rings having at least one radial groove therein extending normal to said bore, each of said grooves extending from the outer surface of its respective bushing to the inner surface thereof, said main body having a plurality of radially extending spaced holes in the wall thereof, one of said holes communicating with each one of the spaces between adjacent bushings and with each one of the spaces between said abutments and the bushings adjacent thereto thereby affording a passageway for conducting lubricant to said bore.

2. Fluid valve means comprising an elongated main body having an axial bore and fluid inlet and outlet openings, a ported valve plunger axially reciprocable in said bore, a spacer sleeve in said bore adjacent each end thereof, a plurality of apertured bushings disposed in spaced axial alignment in said bore between said spacer sleeves, said sleeves and said bushings surrounding said plunger and said plunger being axially slidable in said sleeves and bushings, said bushings being of a number to correspond to the inlet and outlet openings of said main body, the apertures in said bushings communicating with said inlet and outlet openings, each of said bushings having a cut-away portion at each end extending around the inner circumference thereof, an annular C cup sealing ring of resilient material seated in each of said cut-away portions surrounding said plunger for sealing against the flow of fluid therealong, the C cups in the cut-away portions in opposing ends of said bushings being disposed with their open sides facing each other, the C cup in said cut-away portions adjacent each sleeve being disposed with its open side facing the adjacent sleeve, at least one O-ring seal seated around the outer periphery of each of said bushings for preventing the flow of fluid along said bore, a rigid annular separator ring disposed between adjacent ones of said bushings and between said sleeves and the bushings adjacent thereto, each of said separator rings having an inside diameter greater than the outside diameters of the C cups adjacent thereto but less than the outside diameters of the bushings and sleeves adjacent thereto, the end of one of said bushings and said sleeve adjacent each of said annular separator rings having at least one radial groove therein extending normal to said bore, each of said grooves extending from the outer surface of its respective bushing to the inner surface thereof, said main body having a plurality of radially extending spaced holes in the wall thereof, one of said holes communicating with each one of the spaces between adjacent bushings and with each one of the spaces between said sleeves and the bushings adjacent thereto thereby affording a passageway for conducting lubricant to said bore.

3. Fluid valve means as defined by claim 2 including a rigid perforated ring disposed in the open sides of each pair of adjacent opposed C cup sealing rings.

References Cited by the Examiner

UNITED STATES PATENTS

| 569,907 | 10/1896 | Zinn | 137—625.68 |
| 1,431,101 | 10/1922 | Dineen | 137—625.42 |
| 1,970,638 | 8/1934 | Welch | 184—105 |
| 2,320,905 | 6/1943 | Bateholts | 137—625.42 X |
| 2,645,450 | 7/1953 | Chessman | 137—625.68 |
| 2,822,824 | 2/1958 | Glower | 137—625.42 |

ISADOR WEIL, *Primary Examiner.*